US012584047B2

(12) United States Patent
Aoki et al.

(10) Patent No.: US 12,584,047 B2
(45) Date of Patent: Mar. 24, 2026

(54) ELECTRICALLY PEELABLE ADHESIVE COMPOSITION, ELECTRICALLY PEELABLE ADHESIVE PRODUCT, AND UTILIZATION THEREOF

(71) Applicant: VIGteQnos co., ltd., Gose (JP)

(72) Inventors: Takahiro Aoki, Gose (JP); Takashi Tomoda, Gose (JP)

(73) Assignee: VIGteQnos co., ltd., Gose (JP)

(*) Notice: Subject to any disclaimer, the term of this patent is extended or adjusted under 35 U.S.C. 154(b) by 98 days.

(21) Appl. No.: 18/293,973

(22) PCT Filed: Feb. 10, 2022

(86) PCT No.: PCT/JP2022/005471
§ 371 (c)(1), (2) Date: Jan. 31, 2024

(87) PCT Pub. No.: WO2023/152911
PCT Pub. Date: Aug. 17, 2023

(65) Prior Publication Data
US 2024/0336816 A1 Oct. 10, 2024

(51) Int. Cl.
*C09J 133/08* (2006.01)
*C08G 18/62* (2006.01)
(Continued)

(52) U.S. Cl.
CPC ........ *C09J 133/08* (2013.01); *C08G 18/6229* (2013.01); *C09J 7/385* (2018.01); *C09J 11/06* (2013.01); *C09J 2301/502* (2020.08)

(58) Field of Classification Search
CPC .. C09J 2301/502; C09J 9/02; C09J 2301/314; C09J 133/08
See application file for complete search history.

(56) References Cited

U.S. PATENT DOCUMENTS

2021/0277286 A1 9/2021 Mizobata et al.
2022/0195259 A1 6/2022 Aoki et al.
(Continued)

FOREIGN PATENT DOCUMENTS

JP 2004-162070 A 6/2004
JP 2010-037354 A 2/2010
(Continued)

OTHER PUBLICATIONS

Japan Patent Office, International Search Report issued in corresponding Application No. PCT/JP2022/005471, mailed Apr. 19, 2022.

*Primary Examiner* — Scott W Dodds
(74) *Attorney, Agent, or Firm* — Stites & Harbison, PLLC; Jeffrey A. Haeberlin; Trevor T. Graves

(57) ABSTRACT

The present invention is to address the problem of providing an electrically peelable adhesive product having excellent electrical peelability even under conditions where the adhesive product is exposed to high temperature conditions over a long period of time. The problem is solved by an electrically peelable adhesive composition comprising an acrylic polymer, an ionic liquid and an alkyl ether of a polyethylene glycol, wherein a content of the ionic liquid is more than 30 parts by weight and 90 parts by weight or less relative to 100 parts by weight of the acrylic polymer and a content of the alkyl ether of the polyethylene glycol is 5 parts by weight to 45 parts by weight relative to 100 parts by weight of the acrylic polymer.

11 Claims, 4 Drawing Sheets

(51) Int. Cl.
*C09J 7/38* (2018.01)
*C09J 11/06* (2006.01)

(56) References Cited

U.S. PATENT DOCUMENTS

| | | | | |
|---|---|---|---|---|
| 2023/0159799 | A1 | 5/2023 | Akamatsu et al. | |
| 2023/0167339 | A1* | 6/2023 | Akamatsu ......... | C08F 220/1804 428/425.8 |

FOREIGN PATENT DOCUMENTS

| | | | |
|---|---|---|---|
| JP | 2010-037355 | A | 2/2010 |
| JP | 2020-164778 | A | 10/2020 |
| JP | 2021-161389 | A | 10/2021 |
| WO | 2020/050169 | A1 | 3/2020 |
| WO | 2021/166803 | A1 | 8/2021 |
| WO | 2021/177197 | A1 | 9/2021 |
| WO | 2023/152912 | A1 | 8/2023 |

* cited by examiner

ELECTRICALLY PEELABLE ADHESIVE COMPOSITION, ELECTRICALLY PEELABLE ADHESIVE PRODUCT, AND UTILIZATION THEREOF

TECHNICAL FIELD

The present invention relates to an electrically peelable adhesive composition. The present invention relates to an electrically peelable adhesive product. The present invention relates to method for peeling an electrically peelable adhesive product.

BACKGROUND ART

Adhesives and adhesive tapes having adhesiveness to adherends and peelability from adherends have been used for a variety of purposes (for example, surface protection films, masking tapes for painting and peelable memo pads). As methods for peeling an adhesive from an adherend, physically peeling the adhesive is known, as well as peeling the adhesive by means of stimulation such as light, heat, vibration or electric current. For example, Japanese Unexamined Patent Application Publication No. 2010-037354 (PATENT LITERATURE 1) indicates that an adhesive (electrically peelable adhesive) that can be peeled from an adherend by application of voltage can be provided by using a polymer and ionic liquid for the adhesive. U.S. patent application Ser. No. 17/602,212 (PATENT LITERATURE 2) indicates that by appropriately adjusting conditions of a migration accelerator or the like used with a polymer and an ionic liquid, an electrically peelable adhesive that does not leave any adhesive deposit even after application of a low voltage can be provided.

CITATION LIST

Patent Literature

PATENT LITERATURE 1: Japanese Unexamined Patent Application Publication No. 2010-037354

PATENT LITERATURE 2: U.S. patent application Ser. No. 17/602,212

SUMMARY OF INVENTION

Technical Problems

The inventors of the present invention found, during research on electrically peelable adhesives, the electrically peelable adhesive composition disclosed in PATENT LITERATURE 2 has, despite excellent electrical peelability during use under room temperature, a novel problem of reduced electrical peelability when being exposed to a high temperature environment over a long period of time. An object of the present invention therefore is to provide, in order to apply electrically peelable adhesives to various products, an electrically peelable adhesive product having excellent electrical peelability even when being exposed to a high temperature environment over a long period of time.

Solution to Problems

The inventors of the present invention have found that it is possible to provide an electrically peelable adhesive product having excellent electrical peelability even when being exposed to a high temperature environment over a long period of time by appropriately adjusting the amounts of an ionic liquid and migration accelerator in an electrically peelable adhesive composition, thereby achieving the present invention. The present invention thus provides an electrically peelable adhesive composition including an acrylic polymer, an ionic liquid and an alkyl ether of a polyethylene glycol, wherein a content of the ionic liquid is more than 30 parts by weight and 90 parts by weight or less relative to 100 parts by weight of the acrylic polymer and a content of the alkyl ether of the polyethylene glycol is 5 parts by weight to 45 parts by weight relative to 100 parts by weight of the acrylic polymer.

The present invention also provides an electrically peelable adhesive product including a base material and an electrically peelable adhesive layer formed so as to be in contact with the base material, wherein the electrically peelable adhesive layer contains the electrically peelable adhesive composition. The present invention further provides an electrically peelable adhesive product including a core material and two electrically peelable adhesive layers formed so as to be respectively in contact with either side of the core material, wherein the electrically peelable adhesive layers contain the electrically peelable adhesive composition.

The present invention further provides a method for peeling the electrically peelable adhesive product, the method including: attaching the electrically peelable adhesive product onto a conductive object in such a way that the adhesive layer comes in contact with the conductive object; and applying a voltage of 30 V or less to the adhesive layer through the conductive object to which the adhesive product is directly adhered, thereby peeling the adhesive product, wherein the conductive object is any of a conductive adherend, a conductivity auxiliary material and a conductive fixing object.

Advantageous Effects of Invention

The present invention provides an electrically peelable adhesive composition having excellent electrical peelability even when being exposed under high temperature conditions.

DESCRIPTION OF EMBODIMENTS

Figure 1:
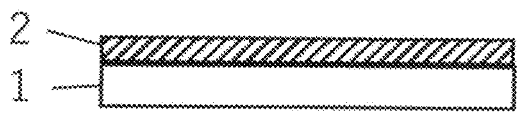
FIG. 1 shows an example of a cross-section of an electrically peelable adhesive product in the form of a single-sided tape.

As used herein, the expression "x to y" wherein x and y are specific values, means x or more to y or less unless otherwise stated.

Acrylic Polymer

An acrylic polymer of the present embodiment can be obtained by polymerising an acrylic monomer in the presence of an optional polymerisation initiator. The acrylic polymer may be any polymer as long as the polymer can be adhered to a conductive object. The conductive object refers to any of the following: a conductive adherend, a conductivity auxiliary material, a conductive base material and a conductive fixing object (the definitions thereof will be described below). From the viewpoint of adhesiveness, the acrylic polymer preferably has a weight average molecular weight of 100,000 to 5,000,000 and more preferably 200,000 to 4,000,000 and more preferably 300,000 to 3,000,000. The weight average molecular weight as used herein refers to the polystyrene-equivalent weight average molecular weight. Specifically, the weight average molecular weight may be the polystyrene-equivalent weight average molecular weight calculated using GPC (System 21) available from Shodex with tetrahydrofuran as a mobile phase.

The acrylic polymer has a glass transition temperature (Tg) of preferably 0° C. or lower, more preferably −20° C. or lower and more preferably −40° C. or lower. Said Tg can be calculated, for example, according to the following Fox formula:

$$1/Tg = (W1/Tg1) + (W2/Tg2) + \ldots\ldots + (Wn/Tgn)$$

The glass transition temperature can be measured by, for example, differential thermal analysis (DTA).

The acrylic polymer may be cross-linked by the action of a cross-linking agent. Examples of the cross-linking agent include isocyanate-based cross-linking agents such as toluene diisocyanate and methylenebisphenylisocyanate. The amount of the cross-linking agent is preferably 1 part by weight to 10 parts by weight or less, more preferably 3 parts by weight to 10 parts by weight and more preferably 5 parts by weight to 10 parts by weight or less relative to 100 parts by weight of the acrylic polymer. When an electrically peelable adhesive composition is formed as a layer on a base material, cross-linking of the acrylic polymer can improve creep resistance and/or shear resistance of the layer.

The acrylic polymer more preferably contains a copolymer of an alkyl (meth) acrylate having an alkyl group with 1 to 8 carbon atoms, a carboxyl group-containing acrylic monomer and/or a hydroxy group-containing acrylic monomer. The acrylic polymer containing such a copolymer can provide an electrically peelable adhesive composition having excellent adhesibility.

Acrylic Monomer

The acrylic monomer preferably contains an alkyl (meth) acrylate having an alkyl group with 1 to 14 carbon atoms as a main component (50% by weight or more). The term "(meth)acrylate" as used herein means methacrylate or acrylate.

Examples of the alkyl (meth)acrylate having an alkyl group with 1 to 14 carbon atoms include methyl (meth) acrylate, ethyl (meth)acrylate, n-propyl (meth)acrylate, isopropyl (meth)acrylate, n-butyl (meth)acrylate, sec-butyl (meth)acrylate, t-butyl (meth)acrylate, n-octyl (meth)acrylate, isooctyl (meth)acrylate, 2-ethylhexyl (meth)acrylate, isononyl (meth)acrylate and dodecyl (meth)acrylate. These alkyl (meth)acrylates may be used respectively alone or in combination of two or more. Of these alkyl (meth)acrylates, an alkyl (meth) acrylate having an alkyl group with 1 to 8 carbon atoms is preferable, an alkyl (meth)acrylate having an alkyl group with 1 to 4 carbon atoms is more preferable, n-butyl (meth)acrylate is more preferably and n-butyl acrylate is more preferable.

Examples of additional acrylic monomer include carboxyl group-containing monomers such as acrylic acid, methacrylic acid and carboxyethyl acrylate; and hydroxy group-containing monomers such as 2-hydroxyethyl (meth) crylate, 2-hydroxypropyl (meth)acrylate, 4-hydroxybutyl (meth)acrylate, 6-hydroxyhexyl (meth)acrylate and (4-hydroxymethylcyclohexyl)-methyl acrylate. These additional acrylic monomers may be used respectively alone or in combination of two or more. The additional acrylic monomers preferably contain either or both of a carboxyl group-containing monomer and a hydroxy group-containing monomer.

The acrylic monomer may only contain an alkyl (meth) acrylate without containing said additional acrylic monomer. In light of easily obtaining an electrically peelable adhesive composition with desired performance, it is preferable that the content of the additional acrylic monomer is 1% by weight or more and less than 50% by weight, more preferably 5% by weight to 30% by weight and more preferably 5% by weight to 15% by weight.

When either or both of a carboxyl group-containing monomer and a hydroxy group-containing monomer is/are included, the total content of the monomer(s) may be any amount. Preferably, the total content is in the range of 1 part by weight to 20 parts by weight provided that the total monomer amount is 100 parts by weight. Using the monomers in this range can improve adhesive properties. It is more preferable that the total content of the monomer(s) is in the range of 1 part by weight to 10 parts by weight.

A vinyl monomer may be optionally added to the (meth) acrylate. Examples of the vinyl monomer include itaconic acid, maleic acid, crotonic acid, maleic anhydride, itaconic anhydride, vinyl acetate, N-vinylpyrrolidone, N-vinylcarboxylic amides, styrene and N-vinylcaprolactam. These vinyl monomers may be used respectively alone or in combination of two or more.

Polymerisation Initiator

Examples of the polymerisation initiator that may be optionally used include azo polymerisation initiators such as 2,2'-azobisisobutyronitrile, 2,2'-azobis (2-methylpropionamidine) disulphide, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate), 2,2'-azobis[2-methyl-N-(phenylmethyl)-propionamidin] dihydrochloride, 2,2'-azobis[2-(3,4,5,6-tetrahydropyrimidin-2-yl) propane] dihydrochloride and 2,2'-azobis[2-(2-imidazolin-2-yl) propane]; persulphate polymerisation initiators such as potassium persulphate and ammonium persulphate; peroxide polymerisation initiators such as benzoyl peroxide, hydrogen peroxide, t-butyl hydroperoxide, di-t-butyl peroxide, t-butylperoxybenzoate, dicumyl peroxide, 1,1-bis(t-butylperoxy)-3,3,5-trimethylcyclohexane, 1,1-bis(t-butylperoxy)cyclododecane, 3,3,5-trimethyl cyclohexanoyl peroxide and t-butyl peroxypivalate; and redox polymerisation initiators containing persulphates and sodium hydrogen sulphite. These polymerisation initiators may be used respectively alone or in combination of two or more. Alternatively, ultraviolet or radioactive rays may be irradiated. The polymerisation initiator is preferably used in the range of 0.005 parts by weight or more and 1 part by weight or less relative to 100 parts by weight of the acrylic monomer. Using the polymerisation initiator in this range can form the acrylic polymer having excellent adhesive properties.

Ionic Liquid

Ionic liquids are combinations of cations and anions that are liquid at room temperature, and are also referred to as ambient-temperature molten salts. Ionic liquids have properties such as noncombustibility, nonvolatility and chemical stabilities. When a voltage is applied to an ionic liquid, anions move towards the anode and cations move towards the cathode. It is believed that as a result of movements of anions and cations towards electrodes or redox reactions of anions or cations at an interface between an electrode and an electrically peelable adhesive composition, the adhesibility of the electrically peelable adhesive composition is weakened, thereby increasing peelability.

The ionic liquid has any ionic conductivity. Preferred ionic conductivity is $10^{-7}$ S/cm or more, preferably $10^{-6}$ S/cm to $10^{-1}$ S/cm, more preferably $10^{-4}$ S/cm to $10^{-2}$ S/cm and more preferably $10^{-3}$ S/cm to $10^{-2}$ S/cm. The ionic conductivity can be measured by, for example, the AC impedance method. The ionic conductivity of an ionic liquid can be measured by the AC impedance method, for example, as follows.

At room temperature in a two-electrode cell, an ionic liquid is placed on a stainless steel plate and another stainless steel plate is placed on the ionic liquid to place the ionic liquid between the stainless steel plates. A sample is obtained by controlling the shape to be a disc having a certain area and thickness using a spacer. A Cole-Cole plot is obtained when a voltage is applied to the sample and the frequency defining the amplitude is varied and is fitted using the equivalent circuit to determine bulk resistance (Ω). The ionic conductivity δ of the ionic liquid can be calculated from following equation using A: the area of the sample, L: the thickness of the sample and Rb: the bulk resistance:

$$\delta = L/(Rb \times A),$$

wherein δ is the ionic conductivity; Rb is the bulk resistance; L (cm) is the thickness of the sample; and A ($cm^2$) is the area of the sample.

An example of the ionic liquid is a combination of a cyclic cation and an anion represented by following formula (1):

(1)

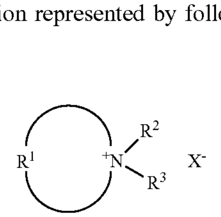

wherein:

$R^1$ is a bivalent hydrocarbon group with 2 to 8 carbon atoms optionally containing a heteroatom and forms a ring together with $N^+$ in the formula; $R^2$ and $R^3$ are the same or different and respectively are a hydrogen atom or an alkyl group with 1 to 6 carbon atoms, provided that when the nitrogen atom forms a double bond with an adjacent carbon atom, $R^3$ is not present; and $X^-$ is an anion selected from $Cl^-$, $Br^-$, $I^-$, $AlCl_4^-$, $Al_2Cl_{7-}$, $NO_3^-$, $BF_4^-$, $PF_6^-$, $ClO_4^-$, $CH_3COO^-$, $CF_3COO^-$, $CF_3SO_3^-$, $(CF_3SO_2)_2N^-$, $(FSO_2)_2N^-$, $(CF_3SO_2)_3C^-$, $AsF_6^-$, $SbF_6^-$, $NbF_{6-}$, $F(HF)_n^-$, $B(C_6H_5)_4^-$, $C_4F_9SO_3^-$, $CF_3(CF_2)_3SO_3^-$, $(CF_3CF_2SO_2)_2N^-$ and $CF_3CF_2COO^-$.

In the above formula, examples of the ring formed with $R^1$ and $N^+$ include rings obtained by substituting at least one carbon atom forming hydrocarbon rings with a nitrogen atom, the hydrocarbon rings being saturated alicyclic hydrocarbons such as cyclopropane, cyclobutane, cyclopentane, cyclohexane, cycloheptane and cyclooctane and unsaturated cyclic hydrocarbons such as cyclopropene, cyclobutene, cyclopentene, cyclohexene, cycloheptene, cyclooctene, cyclopentadiene and benzene. Examples of the heteroatom include N, O, S and P and the heteroatom is preferably N.

Examples of the alkyl group with 1 to 6 carbon atoms include methyl, ethyl, propyl, butyl, pentyl and hexyl groups. The alkyl groups with 3 to 8 carbon atoms include structural isomers.

Another example of the ionic liquid is a combination of a cation and an anion represented by following formula (2) or (3):

(2)

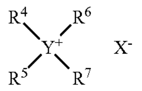

wherein:

Y is N or P; $R^4$ to $R^7$ are the same or different and respectively are a hydrogen atom (provided that not all of $R^4$ to $R^7$ are hydrogen atoms) or a linear or branched or cyclic alkyl group with 1 to 20 carbon atoms optionally having a substituent (provided that when the nitrogen atom forms a double bond together with an adjacent carbon atom, $R^7$ is not present), wherein the substituent is selected from the group consisting of halogen atoms and hydroxy, nitro and cyano groups; and $X^-$ is an anion selected from $Cl^-$, $Br^-$, $I^-$, $AlCl_4^-$, $Al_2Cl_{7-}$, $NO_3^-$, $BF_4^-$, $PF_6^-$, $ClO_4^-$, $CH_3COO^-$, $CF_3COO^-$, $CF_3SO_3^-$, $(CF_3SO_2)_2N^-$, $(FSO_2)_2N^-$, $(CF_3SO_2)_3C^-$, $AsF_6^-$, $SbF_6^-$, $NbF_{6-}$, $F(HF)_n^-$, $B(C_6H_5)_4^-$, $C_4F_9SO_3^-$, $CF_3(CF_2)_3SO_3^-$, $(CF_3CF_2SO_2)_2N^-$ and $CF_3CF_2COO^-$;

(3)

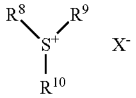

wherein:

$R^8$ to $R^{10}$ are the same or different and respectively are a hydrogen atom (provided that not all of $R^8$ to $R^{10}$ are hydrogen atoms) or a linear or branched or cyclic alkyl group with 1 to 20 carbon atoms optionally having a substituent, wherein the substituent is selected from the group consisting of halogen atoms and hydroxy, nitro and cyano groups; and $X^-$ is an anion selected from $Cl^-$, $Br^-$, $I^-$, $AlCl_4^-$, $Al_2Cl_7$_, $NO_3^-$, $BF_4^-$, $PF_6^-$, $ClO_4^-$, $CH_3COO^-$, $CF_3COO^-$, $CF_3SO_3^-$, $(CF_3SO_2)_2N^-$, $(FSO_2)_2N^-$, $(CF_3SO_2)_3C^-$, $AsF_6^-$, $SbF_6^-$, $NbF_6$_, $F(HF)_n^-$, $B(C_6H_5)_4^-$, $C_4F_9SO_3^-$, $CF_3(CF_2)_3SO_3^-$, $(CF_3CF_2SO_2)_2N^-$ and $CF_3CF_2COO^-$.

The cation in the ionic liquid preferably has a weight average molecular weight of 700 or less, more preferably 50 to 600, more preferably 50 to 500 and more preferably 50 to 400. The upper limit of the weight average molecular weight of the cation in the ionic liquid is, for example, 700, 650, 600, 550, 500, 450, 400, 350, 300, 250, 200 or 150. The lower limit of the weight average molecular weight of the cation in the ionic liquid is, for example, 30, 40, 50, 60, 70, 80, 90, 99 or 100. The weight average molecular weight as used herein refers to the polystyrene-equivalent weight average molecular weight.

The ionic liquid is preferably a combination of a cyclic cation and an anion represented by formula (1), more preferably a combination of a cation selected from pyridinium cations, cyclic aliphatic ammonium cations and imidazolium cations and an anion selected from $(FSO_2)_2N^-$, $(CF_3SO_2)_2N^-$ and $BF_4$—, and more preferably a combination of a cation selected from imidazolium cations and an anion selected from $(FSO_2)_2N$—, $(CF_3SO_2)_2N$— and $BF_4$— in light of increasing peelability after application of a voltage.

The ionic liquid is available from DKS Co., Ltd., Kanto Chemical Co., Ltd. or Koei Chemical Co., Ltd. For example, 1-ethyl-3-methylimidazolium bis(fluorosulphonyl)imide (EMI-FSI) and 1-ethyl-3-methylimidazolium bis(trifluoromethanesulphonyl)imide (EMI-TFSI) are available from DKS Co., Ltd., 1-hexylpyridinium bis(trifluoromethanesulphonyl)imide, N-butyl-N-methylpyrrolidinium bis(trifluoromethanesulphonyl)imide and 1-ethyl-3-methylimidazolium tetrafluoroborate are available from Kanto Chemical Co., Ltd. and 1-ethyl-3-methylimidazolium hexafluorophosphate (IL-C3), 1-butylpyridinium tetrafluoroborate (IL-P10) and1-hexylpyridinium bis (trifluoromethanesulphonyl) imide (IL-P14) are available from Koei Chemical Co., Ltd. The combinations of cations and anions in EMI-FSI and EMI-TFSI are indicated below:

EMI-FSI

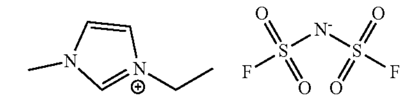

EMI-TFSI

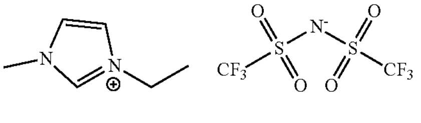

The amount of the ionic liquid in the electrically peelable adhesive composition is 30 parts by weight to 90 parts by weight, preferably more than 30 parts by weight and 90 parts by weight or less, more preferably more than 30 parts by weight and 85 parts by weight or less and more preferably more than 30 parts by weight and 80 parts by weight or less relative to 100 parts by weight of the acrylic polymer. The upper limit of the amount of the ionic liquid in the electrically peelable adhesive composition is, for example, 90 parts by weight, 89 parts by weight, 88 parts by weight, 87 parts by weight, 86 parts by weight, 85 parts by weight, 84 parts by weight, 83 parts by weight, 82 parts by weight, 81 parts by weight or 80 parts by weight relative to 100 parts by weight of the acrylic polymer. The lower limit of the amount of the ionic liquid in the electrically peelable adhesive composition is, for example, 30 parts by weight, 30.1 parts by weight, 30.5 parts by weight, 31 parts by weight, 32 parts by weight, 33 parts by weight, 34 parts by weight, 35 parts by weight, 36 parts by weight, 37 parts by weight, 38 parts by weight, 39 parts by weight or 40 parts by weight relative to 100 parts by weight of the acrylic polymer. The ionic liquid may be a combination of one cation and one anion or a combination of multiple cations and anions.

Because the amount of the ionic liquid in the electrically peelable adhesive composition is 30 parts by weight to 90 parts by weight relative to 100 parts by weight of the acrylic polymer, the composition has excellent electrical peelability even when being exposed to high temperatures. The high temperature as used herein refers to a temperature of 50° C. or higher. In the present embodiment, the phrase "the electrically peelable adhesive composition is exposed to high temperatures" means that the electrically peelable adhesive composition is present in an environment where the temperature of the composition per se may be high. Examples of the environment include the state where the electrically peelable adhesive composition is in direct or indirect contact with a substance having a high temperature, the state where the electrically peelable adhesive composition is placed in a space of high temperature and the combination of the above. The environment where the temperature of the electrically peelable adhesive composition per se may be high may be the environment where the temperature is always high or the environment where the temperature is high during a prescribed period of time. The electrically peelable adhesive composition of the present invention has excellent electrical peelability even when being exposed to high temperatures, and thus the composition can be used even when the temperature of an adherend per se may be high or even under conditions where the temperature of the space where the electrically peelable adhesive composition is placed is high.

Excellent electrical peelability even when being exposed to a high temperature means that the adhesibility of the electrically peelable adhesive composition exposed to a high temperature and then to an application of a voltage is reduced by 50% or more compared to the adhesibility of the electrically peelable adhesive composition exposed to a high temperature without application of a voltage. Specifically, excellent electrical peelability even when being exposed to a high temperature means that a reduction rate of the adhesibility calculated from equation (4) indicated below is 50% or more, namely even when being placed under high temperature conditions such as 80° C. for 100 hours, the adhesibility can be halved or less by application of a voltage (see hereinbelow for the adhesive product, the core material, the conductive adherend and the fixing object in the equation). The reduction rate of the adhesibility is 50% or more and may be 53% or more, 55% or more, 60% or more, 62% or more, 65% or more, 70% or more, 75% or more, 78% or more and 80% or more.

Reduction rate (%)={[Adhesibility of the adhesive product after heating and before application]−[Adhesibility of the adhesive product after heating and application]}/[Adhesibility of the adhesive product after heating and before application]×100, Equation (4)

wherein the adhesibility of the adhesive product after heating and before application refers to the adhesibility obtained by forming an adhesive product in the form of a double-sided tape comprising an adhesive layer formed with the electrically peelable adhesive composition, fixing a conductive adherend to a conductive fixing object with the adhesive product, leaving the object in a space of 80° C. for 100 hours and measuring the adhesibility according to JIS-Z-0237 (2009), and the adhesibility of the adhesive product after heating and application refers to the adhesibility obtained by fixing a conductive adherend to a conductive fixing object with the adhesive product, leaving the object in a space of 80° C. for 100 hours, applying a voltage of 10 V for 60 seconds and measuring the adhesibility according to JIS-Z-0237 (2009).

The above equation (4) may be equation (5) indicated below.

Reduction rate (%) = {[Adhesibility of the adhesive product after heating and before application] − [Adhesibility of the adhesive product after heating and application]}/[Adhesibility of the adhesive product after heating and before application] × 100, Equation (5)

wherein the adhesibility of the adhesive product after heating and before application refers to the force (N/25 mm) required to peel, when an adhesive product in the form of a double-sided tape comprising an adhesive layer formed with the electrically peelable adhesive composition is formed by application of the electrically peelable adhesive composition on a core material, a stainless steel plate is fixed to an aluminium foil with the adhesive product and the object is left in a space of 80° C. for 100 hours, the adhesive product from the adherent by an angle of 180° at a tension rate of 300 mm/min according to JIS-Z-0237 (2009), and the adhesibility of the adhesive product after heating and application refers to the force (N/25 mm) required to peel, when a stainless steel plate is fixed to an aluminium foil with the adhesive product, the object is left in a space of 80° C. for 100 hours and a voltage of 10 V is applied to the object for 60 seconds, the adhesive product from the stainless steel plate by an angle of 180° at a tension rate of 300 mm/min according to JIS-Z-0237 (2009).

Conventional electrically peelable adhesive compositions had reduced electrical peelability in high temperature environments and the adhesibility did not decrease sufficiently for peeling even when a voltage was applied. The electrically peelable adhesive composition of the present invention can lower, even when the composition is exposed to a high temperature, the adhesibility sufficiently for peeling by application of voltage, and thus is suitably used for fixing objects or adherends that may have a high temperature and under conditions where the space used may be high temperature.

Migration Accelerator

In the present embodiment, an alkyl ether of a polyethylene glycol is used as a migration accelerator. Examples of the alkyl ether of polyethylene glycol include polyethylene glycol mono(di)methyl ether, polyethylene glycol mono(di)ethyl ether, polyethylene glycol mono(di)propyl ether, polyethylene glycol mono(di)isopropyl ether, polyethylene glycol mono(di)butyl ether, polyethylene glycol mono(di)isobutyl ether, polyethylene glycol mono(di)methyl ether and polyethylene glycol mono(di)pentyl ether. Among these, the alkyl ether of polyethylene glycol is preferably selected from polyethylene glycol mono(di)methyl ether, is more preferably selected from tetraethylene glycol dimethyl ether (dimethyl tetraglycol), diethylene glycol dibutyl ether, triethylene glycol butyl methyl ether, dimethyl triglycol and triethylene glycol monomethyl ether, and is more preferably selected from dimethyl tetraglycol, diethylene glycol dibutyl ether and triethylene glycol butyl methyl ether. The alkyl ether of polyethylene glycol is available from Nippon Nyukazai Co., Ltd., Toho Chemical Industry Co., Ltd. and the like. The above alkyl ethers of polyethylene glycols may be used respectively alone or in combination of two or more.

The alkyl ether of polyethylene glycol preferably has a weight average molecular weight of 120 to 600, more preferably 120 to 550, more preferably 120 to 500 and more preferably 120 to 360. The upper limit of the weight average molecular weight of the alkyl ether of polyethylene glycol is, for example, 600, 590, 580, 570, 560, 550, 540, 530, 520, 510, 500, 490, 480, 470, 460, 450, 440, 430, 420, 410, 400, 390, 380, 370, 360, 355, 350 or 340. The lower limit of the weight average molecular weight of the alkyl ether of polyethylene glycol is, for example, 120, 125, 130, 135, 140, 145, 150, 155, 160 or 170. The weight average molecular weight as used herein refers to the polystyrene-equivalent weight average molecular weight.

The amount of the migration accelerator in the electrically peelable adhesive composition is in the range of 5 parts by weight to 45 parts by weight relative to 100 parts by weight of the acrylic polymer. The upper limit of the amount of the migration accelerator in the electrically peelable adhesive composition is, for example, 45 parts by weight, 44 parts by weight, 43 parts by weight, 42 parts by weight, 41 parts by weight or 40 parts by weight relative to 100 parts by weight of the acrylic polymer. The lower limit of the amount of the migration accelerator in the electrically peelable adhesive composition is, for example, 5 parts by weight, 6 parts by weight, 7 parts by weight, 8 parts by weight, 9 parts by weight or 10 parts by weight relative to 100 parts by weight of the acrylic polymer.

Organic Solvent

In order to facilitate application of the electrically peelable adhesive composition on a release film or a base material, the electrically peelable adhesive composition may contain an organic solvent. The organic solvent may be any well-known organic solvents that can be used for adhesives. The organic solvent may be either hydrophilic or hydrophobic. Examples of the hydrophilic organic solvent include methanol, ethanol, 1-propanol, 2-propanol, n-butyl alcohol, sec-butyl alcohol, isobutanol, tert-butyl alcohol, acetonitrile, acetone and dimethylformamide. Examples of the hydrophobic organic solvent include aliphatic hydrocarbons such as hexane, heptane and isooctane; esters such as methyl acetate, ethyl acetate and propyl acetate; aromatic hydrocarbons such as benzene, toluene, xylene and ethyl benzene; halogenated hydrocarbons such as dichloromethane, 1,2-dichloroethane, chloroform, 1-chlorobutane and chlorobenzene; ethers such as diethyl ether and t-butyl methyl ether; and ketones such as methyl ethyl ketone and methyl isobutyl ketone. These organic solvents may be used respectively alone or in combination of two or more. When the organic solvent is used, the proportion thereof is preferably adjusted so that the solid content of the acrylic polymer is 10% by weight or more. The proportion is more preferably adjusted so that the solid content is 20% by weight to 50% by weight.

Additives

The electrically peelable adhesive composition of the present embodiment may contain an additive such as a conductive material, a filler, a plasticizer, an antioxidant, a flame retardant, a colourant, a surfactant and an adhesive other than the acrylic polymer.

Conductive materials are mainly divided into carbon-containing conductive materials and metal-containing conductive materials. Examples of the carbon-containing conductive material include nanocarbon and carbon fibres such as vapour grown carbon fibres (VGCFs) and carbon nanofibres, and specifically natural graphite, artificial graphite, acetylene black, ketjen black and furnace black. Examples of the metal-containing conductive materials include metals such as Cu, Ni, Al, Ag, Au, Pt, Zn and Mn and alloys thereof. The conductive materials may be used respectively alone or in combination of two or more.

Examples of the filler include silica, diatomaceous earth, alumina, zinc oxide, magnesium oxide, calcium carbonate, magnesium carbonate, calcium sulphate, barium sulphate, calcium silicate, talc, mica, bentonite, activated white earth, glass fibres and aluminium nitride. The fillers may be used respectively alone or in combination of two or more.

Examples of the plasticizer include polyols such as glycerol, diglycerol, triglycerol, ethylene glycol, propylene glycol and polyethylene glycol; aliphatic polycarboxylic acid esters such as adipic acid esters, citric acid esters, sebacic acid esters, azelaic acid esters and maleic acid esters; aromatic polycarboxylic acid esters such as terephthalic acid esters, isophthalic acid esters, phthalic acid esters, trimellitic acid esters and benzoic acid esters; and polyesters. These plasticizers may be used respectively alone or in combination of two or more.

Examples of the antioxidant include phenolic antioxidants, amine antioxidants, lactone antioxidants, phosphorus antioxidants and sulphur antioxidants. These antioxidants may be used respectively alone or in combination of two or more.

Examples of the flame retardant include additive and reactive flame retardants such as phosphorus and halogen-containing organic compounds, bromine or chlorine-containing organic compounds, ammonium polyphosphates, aluminium hydroxide and antimony oxide. These flame retardants may be used respectively alone or in combination of two or more.

Examples of the colourant include inorganic pigments such as carbon black, titanium oxide, zinc oxide, iron oxide and mica; and organic pigments such as coupling azo pigments, condensed azo pigments, anthraquinone pigments, thioindigo pigments, dioxazone pigments and phthalocyanine pigments. These colourants may be used respectively alone or in combination of two or more.

Examples of the surfactant include anionic surfactants such as alkylbenzene sulphonates, α-olefin sulphonates and phosphate esters; cationic surfactants such as amine salts (such as alkyl amine salts and imidazolines) and quaternary ammonium salts (such as dialkyldimethylammonium salts, alkylbenzyldimethylammonium salts, pyridinium salts and benzethonium chloride); and nonionic surfactants such as sorbitan tristearate, sorbitan monopalmitate, sorbitan trioleate, monoglycerol stearate, polyoxyethylene nonyl phenyl ether and polyoxyethylene dodecyl ether. These surfactants may be used respectively alone or in combination of two or more.

Examples of the adhesive other than the acrylic polymer include silicone adhesives, polyester adhesives, urethane adhesives and rubber adhesives. Examples of the silicone adhesive include those based on dimethylsiloxane and diphenylsiloxane. Examples of the polyester adhesive include polyesters obtained by polycondensation of a carboxylic acid component having two or more functional groups and a diol component. Examples of the urethane adhesive include urethane polymers obtained by reaction of a polyol and a polyisocyanate compound. Examples of the rubber adhesive include synthetic and natural rubbers such as styrene-isoprene block copolymers, styrene-butadiene-styrene block copolymers, styrene-butadiene rubbers, polyisoprene rubbers, polyisobutylenes and butyl rubbers.

The amount of the adhesive other than the acrylic polymer is 40 parts by weight or less, preferably 35 parts by weight or less, more preferably 30 parts by weight or less, more preferably 20 parts by weight or less, more preferably 10 parts by weight or less, more preferably 5 parts by weight or less, more preferably 3 parts by weight or less relative to 100 parts by weight of the acrylic polymer, and it is more preferable that the adhesive other than the acrylic polymer is not included.

Any amount of the additive (except for the adhesive other than the acrylic polymer) may be included in the electrically peelable adhesive composition. The amount may be, for example, in the range of 0.1 parts by weight to 200 parts by weight or 1 part by weight to 100 parts by weight relative to 100 parts by weight of the acrylic polymer.

Method for Producing Electrically Peelable Adhesive Composition

The electrically peelable adhesive composition of the present embodiment can be produced by stirring the acrylic polymer, the ionic liquid, the migration accelerator and an optional crosslinking agent and the like. Any well-known stirring methods may be used. Specifically, the acrylic polymer, the ionic liquid, the migration accelerator and an optional crosslinking agent may be stirred with a V-type mixer or a mixer (such as dissolver, homomixer or planetary mixer). Said additive may be added at the time of stirring.

Application of Electrically Peelable Adhesive Composition

The electrically peelable adhesive composition of the present embodiment has excellent electrical peelability even when being exposed under high temperature conditions. Because of the above, the electrically peelable adhesive composition is suitably used under conditions where the temperature of the electrically peelable adhesive composition may be high, under which conditions conventional electrically peelable adhesive compositions could not be otherwise used because the electrical peelability decreases. Examples of such conditions include the vicinity of car engines, the vicinity of driving parts of home electrical appliances and during production of electronic components and metallic components.

As mentioned above, the electrically peelable adhesive composition of the present embodiment is suitably used under conditions where the temperature may be high. However, use under conditions where the temperature is always normal is not excluded, and the electrically peelable adhesive composition can be suitably used under such conditions as conventional electrically peelable adhesive compositions. Thus, the electrically peelable adhesive composition of the present embodiment can be easily peeled off from conductive articles by applying a voltage without UV irradiation or heating, and thus can be suitably used for fixation of a non-transparent component that cannot be exposed to UV rays or components that are vulnerable to heat. For example, when products such as home electrical appliances and personal computers contain valuable components or components that are sought to be safely recovered and recycled, such components may be fixed using the electrically peelable adhesive composition of the present invention and marketed, then home electrical appliances or personal computers after use may be collected and a voltage may be applied to the fixed components, allowing easy recovery of the components. Easy recovery of components is useful in light of recycling and reusability. Alternatively, the electrically peelable adhesive composition can be suitably used for fixation of components required to have high processing accuracy and fixation of components such as thin metallic plates and substrates for which physical fixation is not practical. For example, a component during production process of electronic components may be temporarily fixed with the electrically peelable adhesive composition (for example, temporary fixation of wafers during dicing of LSI chips), and temporary fixation of the component can be easily cancelled by applying a voltage. Other applications include joining between sensors and conductive articles. In this application, a sensor can be easily recovered by peeling the same with application of a low voltage and the sensor can be repeatedly used, making it economical.

The electrically peelable adhesive composition of the present embodiment regains adhesiveness over time after application of a voltage. Because of this, the electrically peelable adhesive composition after application of a voltage is reusable. This is because anions and cations of the ionic liquid which migrated towards opposite directions by application of a voltage migrate over time so that the anions and cations are again uniformly distributed in the electrically peelable adhesive composition. The electrically peelable adhesive composition of the present embodiment can be repeatedly used as the adhesive, and thus is economically preferable and useful in light of recycling and reusability.

Electrically Peelable Adhesive Product

An electrically peelable adhesive product (hereinafter also merely referred to as adhesive product) of the present embodiment includes a base material and an electrically peelable adhesive layer that is formed so as to be in contact with the base material. The adhesive product according to another aspect includes a core material and two electrically peelable adhesive layers that are formed so as to be respectively in contact with either side of the core material.

The electrically peelable adhesive layer of the adhesive product contains the electrically peelable adhesive composition. The adhesive product of the present embodiment serves as a substance that fixes, to an adherend, an object (referred to as fixing object) that is to be fixed to the adherend with the adhesive product.

The adhesive product may have any shape. For example, the adhesive product may have any suitable forms according to application thereof such as adhesive tapes and adhesive sheets. The side to be used of the electrically peelable adhesive layer may be protected before use with a release-treated polyethylene terephthalate film or a release paper.

The adherend of the present embodiment refers to an object that provides a place to which the fixing object is fixed via the electrically peelable adhesive composition, the electrically peelable adhesive layer or the adhesive product of the present embodiment.

Fixation as used herein includes direct and indirect fixation. Direct fixation refers to direct contact of the adhesive product with the adherend and the fixing object, and indirect fixation refers to indirect contact of the adhesive product with the adherend and/or the fixing object, thus contact via a conductivity auxiliary material. As long as the fixing object can be fixed to the adherend, the fixation may be direct or indirect.

The adherend may have conductivity (conductive adherend) or may not have conductivity (non-conductive adherend). When the adherend is conductive, the adherend may be directly attached to the adhesive product. When the adherend is non-conductive, the non-conductive adherend must be attached to a conductivity auxiliary material. The conductivity auxiliary material is attached with any tackifier such as those commercially available.

Examples of the conductive adherend include metallic plates, metallic products and metallic workbenches made of a metal such as iron, aluminium, copper, silver and gold or an alloy thereof. Examples of the non-conductive adherend include wooden plywood, plastic products and non-metallic workbenches.

The fixing object of the present embodiment may be any object. When the fixing object has conductivity, the fixing object may be directly attached to the adhesive product. When the fixing object is non-conductive, the fixing object must be firstly attached to a conductivity auxiliary material and then attached to the adhesive product as is the case for the non-conductive adherend.

Examples of the conductive fixing object include foils (having a thickness of less than 100 μm) and plates (having a thickness of 100 μm or more) made of a metal such as iron, aluminium, copper, silver and gold or an alloy thereof, meshes or cloths containing fibres mixed with or coated with the metal or alloy, resin sheets containing the metal or alloy and resin plates having a layer containing the metal, alloy or a conductive metal oxide. Examples of the non-conductive fixing object include resin, wood and plastic plates.

The base material of the present embodiment refers to an planar object to which the electrically peelable adhesive composition is applied. The base material may be conductive or non-conductive.

Examples of the base material included in the adhesive product include foils and plates made of a metal such as aluminium, copper, silver and gold or an alloy thereof, films of polyethylene terephthalate (PET) or polyimide, carbon fibres, paper, woven fabrics and non-woven fabrics. The base material may have any thickness. When the base material included in the adhesive product is non-conductive, the base material is peeled off before use. The base material can be suitably selected according to the shape of the electrically peelable adhesive product used. The base material and core material may be one to which surface the applied electrically peelable adhesive composition adheres as it is, or one to which the electrically peelable adhesive composition penetrates between fibres of the base material and core material. Examples of such a base material include paper and non-woven fabrics.

The electrically peelable adhesive layer may be formed on only one side or both sides of the base material. In this case, the base material is referred to as core material. The core material is required to allow transmission of the ionic liquid between the electrically peelable adhesive layers on both sides at the time of application of a voltage. Because the core material is made of a material that allows transmission of the ionic liquid, adhesibility can be reduced by applying a voltage to the electrically peelable adhesive layers on both sides.

By using the base material or core material, the adhesive product can have a certain strength, thereby improving workability during use.

Any conductivity auxiliary materials may be used as long as the material is conductive. Examples thereof include films deposited with a metal such as aluminium, copper, silver and gold, an alloy thereof or a conductive metal oxide such as indium tin oxide (ITO), cloths containing fibres mixed with or coated with the metal or alloy, resin sheets containing the metal or alloy and resin plates having a layer containing the metal, alloy or the conductive metal oxide.

Figure 2:
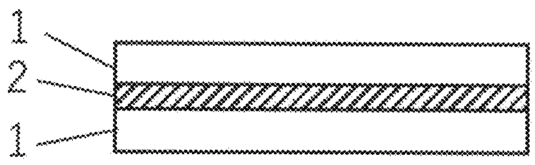
FIG. 2 shows an example of a cross-section of an electrically peelable adhesive product in the form of a double-sided tape.

FIG. 1 shows an example of a cross-section of the adhesive product in the form of a single-sided tape (cross-section created by cutting the tape attached to a horizontal plane in the vertical direction, the same applies hereinafter), and FIG. 2 shows an example of a cross-section of the adhesive product in the form of a double-sided tape. FIG. 3A to FIG. 7B respectively illustrate examples of circuits for applying a voltage to the electrically peelable adhesive layers of the adhesive products through conductive articles and examples of peeling after application of a voltage. The form of use of the adhesive product of the present invention is not limited to the examples of circuits and the examples of peeling indicated hereinbelow. In the examples of peeling indicated hereinbelow, it is illustrated so that the electrically peelable adhesive layer or adhesive product stays with the adherend. However, by reversing the positive and negative directions of the direct-current power supply in these examples, peeling can be carried out so that the adhesive product stays with the fixing object. Which side of the power supply the adhesive product stays depends on the composition of the adhesive product, and the adhesive product may stay at either side.

In the drawings, the reference sign 1 indicates an electrically peelable adhesive layer, the reference sign 2 indicates a base material or a core material, the reference sign 3 indicates a conductive adherend, the reference sign 4 indicates a direct-current power supply, the reference sign 5 indicates a conductive fixing object, the reference sign 6 indicates a non-conductive fixing object, the reference sign 7 indicates an optional tackifier, the reference sign 8 indicates a conductivity auxiliary material, and the reference sign 9 indicates a non-conductive adherend.

Figure 3A:
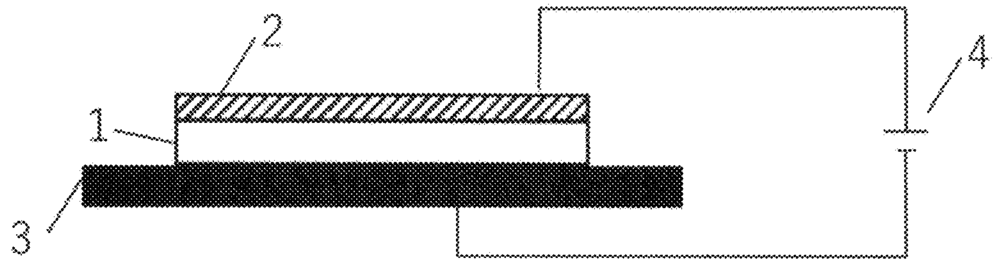
FIG. 3A shows an example of a circuit for applying a voltage to a conductive adherend and a conductive base material to peel the conductive base material from an electrically peelable adhesive product.
Figure 3B:
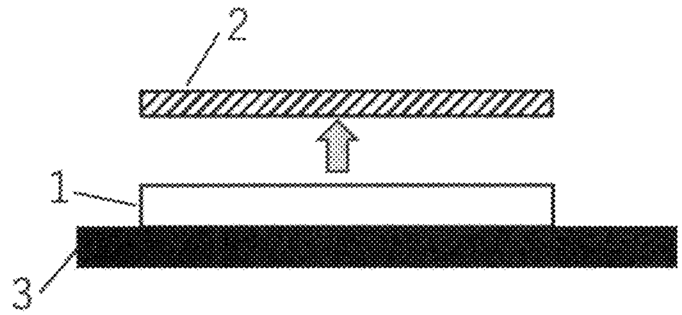
FIG. 3B shows an example of peeling of a conductive base material by applying a voltage.

FIG. 3A illustrates an example of the cross-section of an adhesive product in the form of a single-sided tape adhered to a conductive adherend 3 followed by application of a voltage. The base material 2 is a conductive material. As illustrated in FIG. 3A, the base material 2 and the conductive adherend 3 are connected with terminals, a circuit is formed with the direct-current power supply 4, thereby applying a voltage to the electrically peelable adhesive layer 1, and as illustrated in FIG. 3B, the conductive base material 2 can be peeled off from the conductive adherend 3.

Figure 4A:
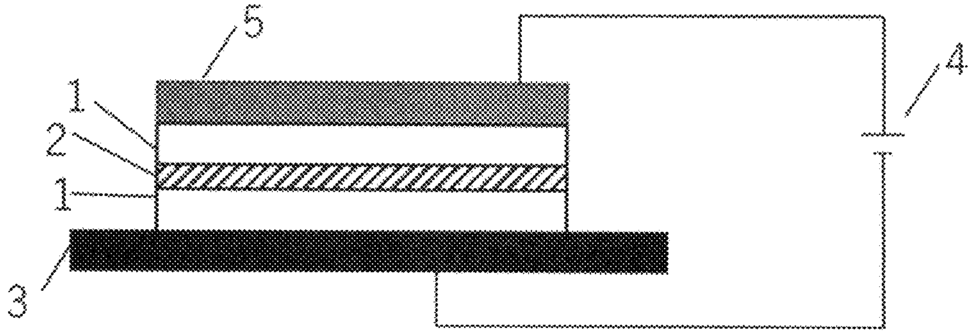
FIG. 4A shows an example of a circuit for applying a voltage to a conductive adherend and a conductive fixing object to peel the conductive fixing object from an electrically peelable adhesive product.
Figure 4B:
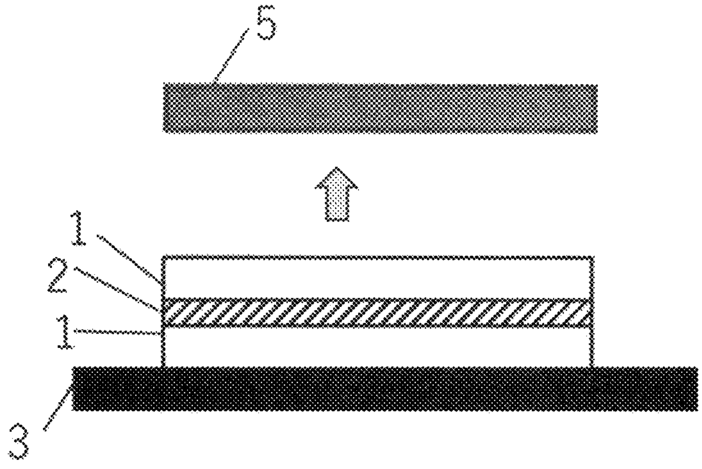
FIG. 4B shows an example of peeling of a conductive fixing object by applying a voltage.

FIG. 4A illustrates an example of the cross-section of a conductive fixing object 5 adhered to a conductive adherend 3 with the adhesive product in the form of a double-sided tape followed by application of a voltage. The double-sided tape includes electrically peelable adhesive layers 1 respectively formed on either side of a core material 2. As illustrated in FIG. 4A, the conductive fixing object 5 and the conductive adherend 3 are connected with terminals, a circuit is formed with the direct-current power supply 4, thereby applying a voltage to the electrically peelable adhesive layer 1, and as illustrated in FIG. 4B, the conductive fixing object 5 can be peeled off from the conductive adherend 3.

Figure 5A:
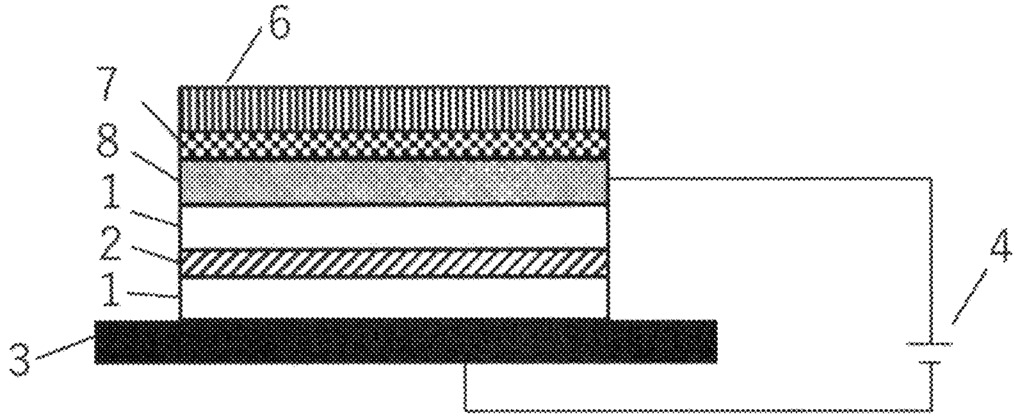
FIG. 5A shows an example of a circuit for applying a voltage to a conductive adherend and a conductivity auxiliary material to peel a non-conductive fixing object from an electrically peelable adhesive product.
Figure 5B:
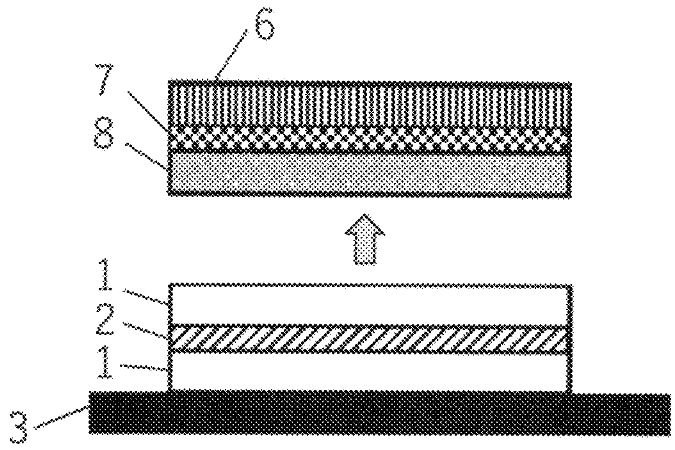
FIG. 5B shows an example of peeling of a non-conductive fixing object by applying a voltage.

FIG. 5A illustrates an example of the cross-section of a non-conductive fixing object 6 adhered to a conductive adherend 3 with the adhesive product in the form of a double-sided tape followed by application of a voltage. As illustrated in FIG. 5A, an aluminium plate as a conductivity auxiliary material 8 is attached to the non-conductive fixing object 6 using an optional tackifier 7 and the non-conductive fixing object 6 and the conductivity auxiliary material 8 are adhered to the conductive adherend 3 using the adhesive product. The conductivity auxiliary material 8 and the conductive adherend 3 are connected with terminals, a circuit is formed with the direct-current power supply 4, thereby applying a voltage to the electrically peelable adhesive layer 1, and as illustrated in FIG. 5B, the non-conductive fixing object 6 can be peeled off from the conductive adherend 3. In this case, the conductivity auxiliary material 8 attached to the non-conductive fixing object 6 stays with the non-conductive fixing object 6.

Figure 6A:
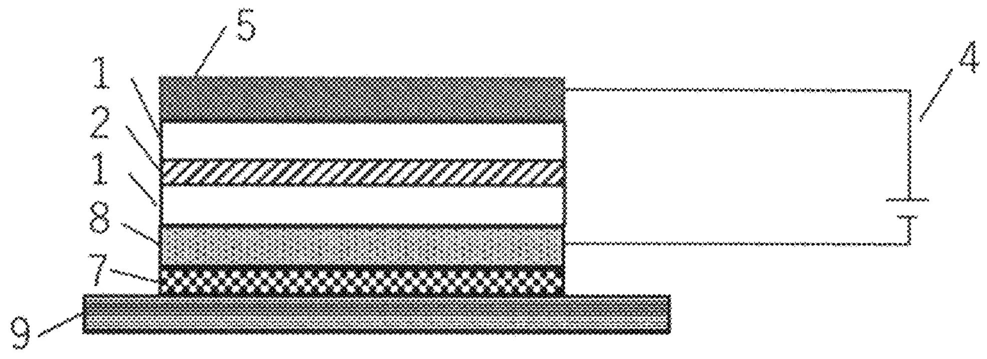
FIG. 6A shows an example of a circuit for applying a voltage to a conductivity auxiliary material and a conductive fixing object to peel the conductive fixing object from an electrically peelable adhesive product.
Figure 6B:
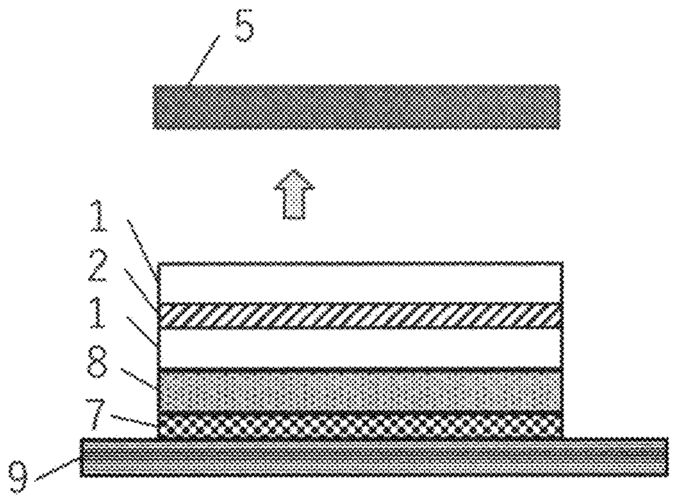
FIG. 6B shows an example of peeling of a conductive fixing object by applying a voltage.

FIG. 6A illustrates an example of the cross-section of a conductive fixing object 5 adhered to a non-conductive adherend 9 with the adhesive product in the form of a double-sided tape followed by application of a voltage. As illustrated in FIG. 6A, an aluminium plate as a conductivity auxiliary material 8 is attached to the non-conductive adherend 9 using an optional tackifier 7 and the conductive fixing object 5 is adhered to the conductivity auxiliary material 8 and the non-conductive adherend 9 using the adhesive product. The conductive fixing object 5 and the conductivity auxiliary material 8 are connected with terminals, a circuit is formed with the direct-current power supply 4, thereby applying a voltage to the electrically peelable adhesive layer 1, and as illustrated in FIG. 6B, the conductive fixing object 5 can be peeled off from the non-conductive adherend 9.

Figure 7A:
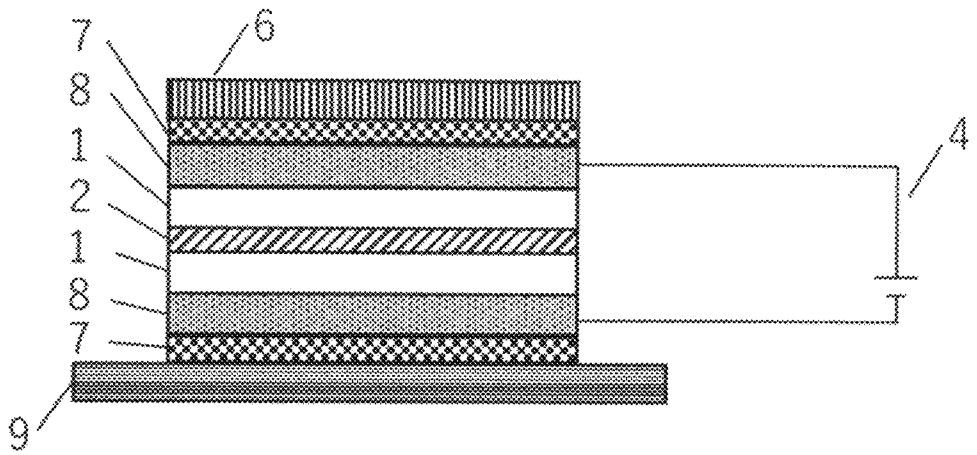
FIG. 7A shows an example of a circuit for applying a voltage to a conductivity auxiliary material adhered to a non-conductive adherend and a conductivity auxiliary material adhered to a non-conductive fixing object to peel the non-conductive fixing object from an electrically peelable adhesive product.
Figure 7B:
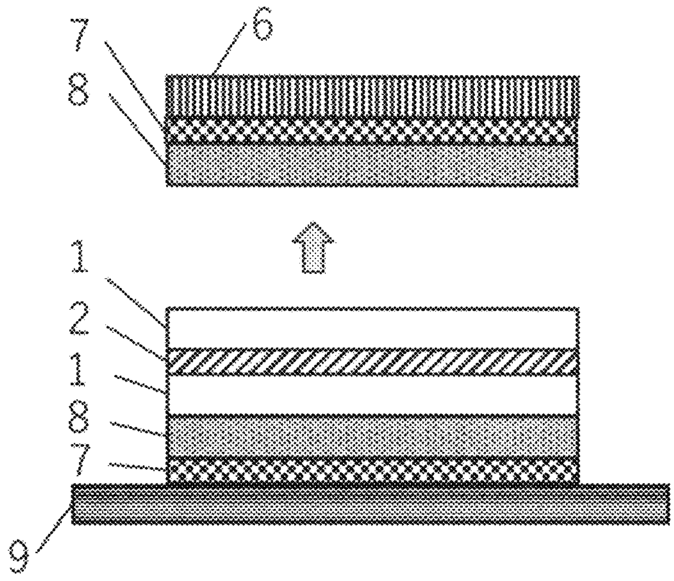
FIG. 7B shows an example of peeling of a non-conductive fixing object by applying a voltage.

FIG. 7A illustrates an example of the cross-section of a non-conductive fixing object 6 adhered to a non-conductive adherend 9 with the adhesive product in the form of a double-sided tape followed by application of a voltage. As illustrated in FIG. 7A, aluminium plates as conductivity auxiliary materials 8 are attached respectively to the non-conductive fixing object 6 and the non-conductive adherend 9 using an optional tackifier 7 and the conductivity auxiliary material 8 adhered to the non-conductive fixing object 6 is adhered to the conductivity auxiliary material 8 adhered to the non-conductive adherend 9 using the adhesive product. The conductivity auxiliary materials 8 are connected with terminals, a circuit is formed with the direct-current power supply 4, thereby applying a voltage to the electrically peelable adhesive layer 1, and as illustrated in FIG. 7B, the non-conductive fixing object 6 can be peeled off from the non-conductive adherend 9. In this case, the conductivity auxiliary material 8 attached to the non-conductive fixing object 6 stays with the non-conductive fixing object 6.

The adhesive product of the present embodiment allows the above respective peeling procedures by application of such a low voltage as 30 V or less.

The electrically peelable adhesive layer can be formed by, for example, applying an electrically peelable adhesive composition to a base material or core material. Any methods for applying the electrically peelable adhesive composition can be used. The electrically peelable adhesive composition may be applied, for example, using a spin coater, a gravure coater, an applicator, a multicoater, a die coater, a bar coater, a roll coater, a blade coater or a knife coater. The electrically peelable adhesive layer may have any thickness. The thickness is preferably in the range of 1 μm to 200 μm, more preferably in the range of 1 μm to 100 μm and more preferably in the range of 1 μm to 50 μm. After the electrically peelable adhesive composition is applied, the electrically peelable adhesive layer may be heated to dry the electrically peelable adhesive composition.

The electrically peelable adhesive layer preferably has adhesibility of 25 N/25 mm or more and more preferably 30 N/25 mm or more before application of a voltage.

The adhesive product of the present embodiment regains adhesiveness of the electrically peelable adhesive composition over time after application of a voltage. Because of this, the adhesive product after application of a voltage is reusable. The adhesive product of the present embodiment can be repeatedly used, and thus is economically preferable and useful in light of recycling and reusability.

Method for Producing Electrically Peelable Adhesive Product

The present invention according to an embodiment relates to a method for producing an electrically peelable adhesive product. The electrically peelable adhesive product can be produced by, for example, applying an electrically peelable adhesive composition to a base material or core material to form an electrically peelable adhesive layer. The electrically peelable adhesive composition, the electrically peelable adhesive layer, the base material, the electrically peelable adhesive product and the method for application are as described hereinabove.

When the electrically peelable adhesive product is in the form of an adhesive tape or an adhesive sheet, the adhesive product may have any thickness. The thickness is preferably in the range of 1 μm to 200 μm and more preferably in the range of 1 μm to 100 μm. The thickness of the electrically peelable adhesive layer and the adhesive product refers to the value measured with a well-known thickness analyser such as PEACOCK precision analyser.

Method for Peeling

The electrically peelable adhesive layer and the adhesive product of the present embodiment can be peeled from a conductive object by applying a voltage after directly attaching the electrically peelable adhesive layer and the adhesive product onto the conductive object.

When the fixing object and the adherend are conductive, the electrically peelable adhesive layer or the adhesive product may be peeled from the fixing object or the adherend by connecting the fixing object and the adherent to terminals and applying a voltage between the terminals. When the fixing object and/or the adherend is not conductive, fixing and peeling are feasible by adhering an aluminium plate or the like as the conductivity auxiliary material. These fixing and peeling procedures are indicated in the above examples of peeling of the adhesive product.

Any voltage may be applied as long as the electrically peelable adhesive layer or the adhesive product can be peeled off. Given the scale of the voltage application device, the impact on the fixing object and risks on human bodies due to accidents during the process, the voltage is preferably low. Examples of the range of the voltage to be applied may be combinations of an upper limit selected from 690 V, 650 V, 600 V, 550 V, 500 V, 480 V, 450 V, 415 V, 400 V, 380 V, 350 V, 347 V, 300 V, 250 V, 240 V, 230 V, 220 V, 210 V, 208 V, 200 V, 180 V, 160 V, 150 V, 130 V, 125 V, 120 V, 115 V, 110 V, 105 V, 100 V, 90 V, 80 V, 70 V, 60 V, 50 V, 40 V and 30 V and a lower limit selected from 0.5 V, 1 V, 2 V, 3 V, 4 V, 5 V, 6 V, 7 V, 8 V, 9 V and 10 V. Among others, the voltage is particularly preferable in the range of 1 V to 30 V in terms of the small size of the application device and the safety and impact on the fixing object.

The electrically peelable adhesive layer and the adhesive product of the present embodiment can be peeled from a conductive object even with such a low applied voltage of several volts, and thus the peeling procedure can be carried out with a power supply such as a commercially available dry-cell battery. This demonstrates that the present embodiment allows peeling with a portable simple application device providing excellent safety for workers.

The voltage may be applied over any period of time as long as the electrically peelable adhesive layer and the adhesive product can be peeled. Given the impact on the fixing object, the time for application is preferably within 10 minutes, more preferably within 5 minutes and more preferably within 3 minutes.

The peeling may be carried out under any temperature. The peeling is preferably carried out at room temperature. Because the electrically peelable adhesive layer and the adhesive product of the present embodiment can be peeled from a conductive object with low voltage and within a short period of time as described above, the impact due to heat onto the fixing object can be extremely lowered.

The present invention according to an embodiment relates to use of an acrylic polymer, an ionic liquid and an alkyl ether of a polyethylene glycol for production of an electrically peelable adhesive composition. The acrylic polymer, the ionic liquid and the alkyl ether of the polyethylene glycol are mixed so that the content of the ionic liquid is 30 parts by weight to 90 parts by weight relative to 100 parts by weight of the acrylic polymer and the content of the alkyl ether of the polyethylene glycol is 5 parts by weight to 45 parts by weight relative to 100 parts by weight of the acrylic polymer, a crosslinking agent, an additive and the like are optionally added and the mixture is stirred according to a well-known method, and the electrically peelable adhesive composition can be produced. The acrylic polymer, the ionic liquid, the alkyl ether of the polyethylene glycol, the cross-linking agent and the additive are as described hereinabove.

The present invention according to an embodiment includes use of an electrically peelable adhesive composition for producing an electrically peelable adhesive product. The electrically peelable adhesive product can be produced by forming an electrically peelable adhesive layer on a base material (or core material) with an electrically peelable adhesive composition. The electrically peelable adhesive composition, the electrically peelable adhesive layer, the base material and the electrically peelable adhesive product are as described hereinabove.

EXAMPLES

The present invention will be further specifically described hereinbelow by way of Examples and Comparative Examples. However, the present invention is not limited to those Examples.

Example 1

An adhesive product was prepared as follows with an acrylic polymer, an ionic liquid and a migration accelerator.

1. Preparation of Acrylic Polymer

Into a glass flask were charged a monomer mixture containing 91 parts by weight of n-butyl acrylate (Mitsubishi Chemical Corporation), 8 parts by weight of acrylic acid (Mitsubishi Chemical Corporation) and 1 part by weight of 2-hydroxyethyl methacrylate (Nippon Shokubai Co., Ltd.) and 186 parts by weight of a polymerization solvent (ethyl acetate: toluene (weight ratio) =9:1), the flask was purged with nitrogen gas, 0.2 parts by weight of azobisisobutyronitrile (AIBN, Junsei Chemical Co., Ltd.) was added as a polymerization initiator, the temperature was raised to 85° C. for polymerization reaction over 5 hours, thereby obtaining an acrylic adhesive. The obtained acrylic adhesive contained 35% by weight of the acrylic polymer (weight average molecular weight: approximately 800,000, Tg: −46° C.) and had a viscosity of 7,000 mPa·s.

2. Preparation of Electrically Peelable Adhesive Composition

To 100 parts by weight of the acrylic adhesive (containing 35 parts by weight of the acrylic polymer) were added 5.0 parts by weight of CORONATER L-55E (Tosoh Corporation) as an isocyanate cross-linking agent, 14.0 parts by weight of ELEXCEL® AS-110 (EMI-FSI, DKS Co., Ltd.) as an ionic liquid and 2.1 parts by weight of dimethyl tetraglycol (Nippon Nyukazai Co., Ltd.; molecular weight: approximately 220) as a migration accelerator, the mixture was stirred at room temperature for 10 minutes using a dissolver and allowed to stand for defoaming to obtain an electrically peelable adhesive composition.

3. Preparation of Adhesive Product

The electrically peelable adhesive composition obtained in 2. above was applied to a polyethylene terephthalate film of which surface was treated with silicone and dried at 100° C. for 5 minutes. The surface of the dried film on which the electrically peelable adhesive composition was applied was attached to a non-woven fabric [MILIFE® TY0503FE (ENEOS Techno Materials Corporation)]. In a similar manner, a film was prepared by applying the electrically peelable adhesive composition on a polyethylene terephthalate film of which surface was treated with silicone and drying the same, and attached to the surface of the non-woven fabric on which the film was not attached. The product was then left to stand at 40° C. for 3 days to obtain an adhesive product (double-sided tape, thickness: 80 μm) of Example 1.

Comparative Example 1

An adhesive product of Comparative Example 1 was obtained in the same manner as in Example 1 except that the migration accelerator was not used.

Comparative Example 2

An adhesive product of Comparative Example 2 was obtained in the same manner as in Example 1 except that the amount of the migration accelerator used was 1.05 parts by weight relative to 100 parts by weight of the acrylic adhesive.

Example 2

An adhesive product of Example 2 was obtained in the same manner as in Example 1 except that the amount of the migration accelerator used was 3.5 parts by weight relative to 100 parts by weight of the acrylic adhesive.

Example 3

An adhesive product of Example 3 was obtained in the same manner as in Example 1 except that the amount of the migration accelerator used was 5.25 parts by weight relative to 100 parts by weight of the acrylic adhesive.

Example 4

An adhesive product of Example 4 was obtained in the same manner as in Example 1 except that the amount of the migration accelerator used was 7.0 parts by weight relative to 100 parts by weight of the acrylic adhesive.

Example 5

An adhesive product of Example 5 was obtained in the same manner as in Example 1 except that the amount of the migration accelerator used was 10.5 parts by weight relative to 100 parts by weight of the acrylic adhesive.

Example 6

An adhesive product of Example 6 was obtained in the same manner as in Example 1 except that the amount of the migration accelerator used was 14.0 parts by weight relative to 100 parts by weight of the acrylic adhesive.

Comparative Example 3

An adhesive product of Comparative Example 3 was obtained in the same manner as in Example 1 except that the amount of the migration accelerator used was 17.5 parts by weight relative to 100 parts by weight of the acrylic adhesive.

Comparative Example 4

An adhesive product of Comparative Example 4 was obtained in the same manner as in Example 2 except that the amount of the ionic liquid used was 7.0 parts by weight relative to 100 parts by weight of the acrylic adhesive.

Example 7

An adhesive product of Example 7 was obtained in the same manner as in Example 2 except that the amount of the ionic liquid used was 17.5 parts by weight relative to 100 parts by weight of the acrylic adhesive.

Example 8

An adhesive product of Example 8 was obtained in the same manner as in Example 2 except that the amount of the ionic liquid used was 21.0 parts by weight relative to 100 parts by weight of the acrylic adhesive.

Example 9

An adhesive product of Example 9 was obtained in the same manner as in Example 2 except that the amount of the ionic liquid used was 24.5 parts by weight relative to 100 parts by weight of the acrylic adhesive.

Example 10

An adhesive product of Example 10 was obtained in the same manner as in Example 2 except that the amount of the ionic liquid used was 28.0 parts by weight relative to 100 parts by weight of the acrylic adhesive.

Example 11

An adhesive product of Example 11 was obtained in the same manner as in Example 1 except that ELEXCEL® IL-210 (EMI-TFSI, DKS Co., Ltd.) was used as the ionic liquid and the amount of the migration accelerator used was 7.0 parts by weight relative to 100 parts by weight of the acrylic adhesive.

Example 12

An adhesive product of Example 12 was obtained in the same manner as in Example 1 except that EMI-TFSI was used as the ionic liquid, the amount of the ionic liquid used was 17.5 parts by weight and the amount of the migration accelerator used was 3.5 parts by weight relative to 100 parts by weight of the acrylic adhesive.

Example 13

An adhesive product of Example 13 was obtained in the same manner as in Example 1 except that the amount of the ionic liquid used was 17.5 parts by weight relative to 100 parts by weight of the acrylic adhesive, the migration accelerator used was diethylene glycol dibutyl ether [HISOLV BDB (Toho Chemical Industry Co., Ltd.)] and the amount of the migration accelerator used was 3.5 parts by weight relative to 100 parts by weight of the acrylic adhesive.

Example 14

An adhesive product of Example 14 was obtained in the same manner as in Example 1 except that the amount of the ionic liquid used was 17.5 parts by weight relative to 100 parts by weight of the acrylic adhesive, the migration accelerator used was triethylene glycol butyl methyl ether [HISOLV BTM (Toho Chemical Industry Co., Ltd.)] and the amount of the migration accelerator used was 3.5 parts by weight relative to 100 parts by weight of the acrylic adhesive.

Evaluations of Adhesibility of Adhesive Products

The release films on one side of the respective adhesive products of Examples 1-14 and Comparative Examples 1-4 were peeled and the adhesive products were attached to aluminium foils (fixing object) having a thickness of 50 μm. After adhesion of the aluminium foils, three specimens respectively of 250 mm × 25 mm were cut out per adhesive product together with the aluminium foils. The release films on the other side of the cut-out adhesive products were peeled and the adhesive products were attached to polished stainless steel plates (conductive adherend: 125 mm×50 mm) over 100 mm×25 mm. A rubber roller of 2 kg was moved back and forth once along the longitudinal direction of the adhesive products at a rate of 300 mm/min, thereby bonding the respective adherends, adhesive products and the fixing objects by pressure to obtain evaluation samples. After 30 minutes of pressure-bonding of the respective adherends, adhesive products and the fixing objects, the evaluation samples were placed in a constant temperature oven under a high temperature environment of 80° C. for 100 hours. The evaluation samples were recovered after 100 hours, placed under room temperature for 2 hours and measured for the force (adhesibility: N/25 mm) required to peel the adhesive tapes from the adherends by an angle of 180° (hereinafter referred to as peeling by) 180° at a tension rate of 300 mm/min according to JIS-Z-0237 (2009) using Autograph® AGS-H available from Shimadzu Corporation, and the measured values were obtained as averages of the values measured for three evaluation samples.

In the same manner as above, three evaluation samples were prepared respectively from the adhesive products of Examples 1 to 14 and Comparative Examples 1 to 4. The evaluation samples were placed in a constant temperature oven under a high temperature environment of 80° C. for 100 hours. The evaluation samples were recovered after 100 hours, and placed under room temperature for 2 hours to which positive and negative electrodes were attached on the side of the conductive adherend and the side of the fixing object, respectively, of the respective evaluation samples. A voltage of 10 V was applied for 60 seconds to the evaluation samples with a direct-current power supply by adjusting the voltage with a transformer. After application of the voltage, the force required for peeling by 180° the adhesive tapes from the adherends was measured in the same manner as above.

The extent of reduction of the adhesibility (reduction rate) of the adhesive products after heating and application of the voltage was evaluated. The reduction rate was calculated according to equation (6) indicated below. The reduction rate of 50% or more means that peeling by application of a voltage is easy. The reduction rate of less than 50% means that the peeling is difficult.

Reduction rate (%)={[Adhesibility of the adhesive product after heating and before application]−[Adhesibility of the adhesive product after heating and application]}/[Adhesibility of the adhesive product after heating and before application]×100     Equation (6)

Table 1 indicates the respective ionic liquids and amounts thereof and the respective migration accelerators and amounts thereof for the adhesive products of Examples 1 to 14 and Comparative Examples 1 to 4, and evaluation results of the respective adhesive products. The amounts indicated in Table 1 are the amounts relative to 100 parts by weight of the acrylic polymer. In Table 1, IA refers to EMI-FSI, IB refers to EMI-TFSI, MA refers to dimethyl tetraglycol, MB refers to diethylene glycol dibutyl ether and MC refers to triethylene glycol butyl methyl ether.

TABLE 1

| | Ionic liquid | | Migration accelerator | | Adhesibility of adhesive product after heating and | Adhesibility of adhesive product after | |
|---|---|---|---|---|---|---|---|
| | Type | Amount (parts by weight) | Type | Amount (parts by weight) | before application (N/25 mm) | heating and application (N/25 mm) | Reduction rate (%) |
| Comp. Ex. 1 | IA | 40 | MA | 0 | 47 | 28 | 40 |
| Comp. Ex. 2 | IA | 40 | MA | 3 | 43 | 31 | 28 |
| Example 1 | IA | 40 | MA | 6 | 48 | 18 | 62 |
| Example 2 | IA | 40 | MA | 10 | 33 | 2 | 94 |
| Example 3 | IA | 40 | MA | 15 | 44 | 10 | 77 |
| Example 4 | IA | 40 | MA | 20 | 38 | 10 | 70 |
| Example 5 | IA | 40 | MA | 30 | 40 | 12 | 70 |
| Example 6 | IA | 40 | MA | 40 | 34 | 16 | 53 |
| Comp. Ex. 3 | IA | 40 | MA | 50 | 29 | 18 | 38 |
| Comp. Ex. 4 | IA | 20 | MA | 10 | 50 | 28 | 44 |
| Example 7 | IA | 50 | MA | 10 | 42 | 1 | 98 |
| Example 8 | IA | 60 | MA | 10 | 41 | 3 | 93 |
| Example 9 | IA | 70 | MA | 10 | 41 | 6 | 85 |
| Example 10 | IA | 80 | MA | 10 | 30 | 6 | 80 |
| Example 11 | IB | 40 | MA | 20 | 33 | 15 | 55 |
| Example 12 | IB | 50 | MA | 10 | 35 | 1 | 97 |
| Example 13 | IA | 50 | MB | 10 | 39 | 5 | 87 |
| Example 14 | IA | 50 | MC | 10 | 35 | 2 | 94 |

The following can be found from the results indicated in Table 1.

All of the adhesive products used in the experiments had the adhesibility before application of the voltage of 25 N/25 mm or more. From this, it is found that the adhesiveness during use is high.

The adhesive products of Examples 1 to 14 had sufficient reduction of the adhesibility after application of the voltage even when the adhesive products were placed under high temperature conditions of 80° C. for 100 hours. On the other hand, the adhesive products of Comparative Examples 1 to 4 had reduced adhesiveness after being placed under high temperature conditions of 80° C. for 100 hours.

From the above experimental results, it was demonstrated that by appropriately adjusting the amounts of the ionic liquid and migration accelerator as in Examples 1 to 14, electrically peelable adhesives obtained can exhibit excellent electrical peelability even after being placed under high temperature conductions.

REFERENCE SIGNS LIST

1 Electrically peelable adhesive layer
2 Base material or core material
3 Conductive adherend
4 Direct-current power supply
5 Conductive fixing object
6 Non-conductive fixing object
7 Optional tackifier
8 Conductivity auxiliary material
9 Non-conductive adherend

What is claimed is:

1. An electrically peelable adhesive composition comprising an acrylic polymer, an ionic liquid and an alkyl ether of a polyethylene glycol, wherein a content of the ionic liquid is more than 30 parts by weight and 90 parts by weight or less relative to 100 parts by weight of the acrylic polymer and a content of the alkyl ether of the polyethylene glycol is 5 parts by weight to 45 parts by weight relative to 100 parts by weight of the acrylic polymer, wherein: (i) the acrylic polymer is a copolymer derived from 90% to 99% by weight of an alkyl (meth) acrylate having an alkyl group with 1 to 4 carbon atoms, and 1% to 10% by weight of a combination of a carboxyl group-containing monomer and a hydroxy group-containing monomer, (ii) the carboxyl group-containing monomer is acrylic acid or methacrylic acid, (iii) the hydroxy group-containing monomer is 2-hydroxyethyl (meth) acrylate, (iv) the ionic liquid is a combination of a cation selected from imidazolium cations and an anion selected from $(FSO_2)_2N^-$, $(CF_3SO_2)_2N^-$ and $BF_4^-$, and (v) the alkyl ether of the polyethylene glycol is dimethyl tetraglycol, diethylene glycol dibutyl ether or triethylene glycol butyl methyl ether.

2. The composition according to claim 1, wherein the alkyl (meth) acrylate having an alkyl group with 1 to 4 carbon atoms is n-butyl (meth) acrylate.

3. The composition according to claim 1, wherein the ionic liquid is the combination of the cation selected from imidazolium cations and the anion selected from $(FSO_2)_2N^-$ and $(CF_3SO_2)_2N^-$.

4. The composition according to claim 3, wherein the ionic liquid is 1-ethyl-3-methylimidazolium bis(fluorosulphonyl)imide or 1-ethyl-3-methylimidazolium bis(trifluoromethanesulphonyl)imide.

5. The composition according to claim 1, having a reduction rate of the adhesibility calculated from equation (2) indicated below of 50% or more:

Reduction rate (%)={[Adhesibility of the adhesive product after heating and before application]−[Adhesibility of the adhesive product after heating and application]}/[Adhesibility of the adhesive product after heating and before application]×100, Equation (2)

wherein the adhesibility of the adhesive product after heating and before application refers to the adhesibility obtained by forming an adhesive product in the form of a double-sided tape comprising an adhesive layer formed with the electrically peelable adhesive composition, fixing a conductive adherend to a conductive fixing object with the adhesive product, leaving the object in a space of 80° C. for 100 hours and measuring the adhesibility according to JIS-Z-0237 (2009), and the adhesibility of the adhesive product after heating and application refers to the adhesibility obtained by fixing a conductive adherend to a conductive fixing object with the adhesive product, leaving the object in a space of 80° C. for 100 hours, applying a voltage of 10 V for 60 seconds and measuring the adhesibility according to JIS-Z-0237 (2009).

6. The composition according to claim 1, which is reusable.

7. An electrically peelable adhesive product comprising a base material and an electrically peelable adhesive layer formed so as to be in contact with the base material, wherein the electrically peelable adhesive layer contains the electrically peelable adhesive composition according to claim 1.

8. The adhesive product according to claim 7, which is reusable.

9. An electrically peelable adhesive product comprising a core material and two electrically peelable adhesive layers formed so as to be respectively in contact with either side of the core material, wherein the electrically peelable adhesive layers contain the electrically peelable adhesive composition according to claim 1.

10. The adhesive product according to claim 9, which is an adhesive tape or an adhesive sheet.

11. A method for peeling the electrically peelable adhesive product according to claim 7, the method comprising: attaching the adhesive product onto a conductive object in such a way that the electrically peelable adhesive layer comes in contact with the conductive object; and applying a voltage of 30 V or less to the adhesive layer through the conductive object to which the adhesive product is directly adhered, thereby peeling the electrically peelable adhesive product, wherein the conductive object is any of a conductive adherend, a conductivity auxiliary material and a conductive fixing object.

* * * * *